(12) United States Patent
Ooi

(10) Patent No.: US 8,259,785 B2
(45) Date of Patent: Sep. 4, 2012

(54) ADAPTIVE EQUALIZER WITH FUNCTION OF STOPPING ADAPTIVE EQUALIZATION PROCESSING AND RECEIVER

(75) Inventor: Yasushi Ooi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 938 days.

(21) Appl. No.: 11/826,185

(22) Filed: Jul. 12, 2007

(65) Prior Publication Data

US 2008/0013617 A1 Jan. 17, 2008

(30) Foreign Application Priority Data

Jul. 14, 2006 (JP) .................... 2006-193857

(51) Int. Cl.
*H03K 5/159* (2006.01)
(52) U.S. Cl. ........ 375/232; 375/219; 375/229; 375/230; 375/233; 375/343
(58) Field of Classification Search .......... 375/220, 375/233, 229, 250, 259, 295, 306, 316, 342, 375/219, 222, 230, 232, 235, 322, 343, 350, 375/354

See application file for complete search history.

(56) References Cited

U.S. PATENT DOCUMENTS

| | | | | |
|---|---|---|---|---|
| 7,542,507 B2 * | 6/2009 | Sohn | ............................ | 375/233 |
| 7,778,323 B1 * | 8/2010 | Nodenot et al. | ............. | 375/233 |
| 7,995,648 B2 * | 8/2011 | Xia et al. | ...................... | 375/233 |
| 8,116,365 B2 * | 2/2012 | Yu et al. | ........................ | 375/232 |
| 2005/0123035 A1 | 6/2005 | Yamamoto et al. | | |
| 2006/0152276 A1 * | 7/2006 | Barksdale | ..................... | 329/315 |
| 2006/0280502 A1 * | 12/2006 | Sekine et al. | ................... | 398/71 |
| 2007/0053419 A1 * | 3/2007 | Park et al. | ..................... | 375/232 |
| 2008/0112289 A1 * | 5/2008 | Nishimura et al. | ......... | 369/53.3 |

FOREIGN PATENT DOCUMENTS

| | | |
|---|---|---|
| JP | 58-17393 A | 10/1983 |
| JP | 60-46607 A | 3/1985 |
| JP | 61-206329 A | 9/1986 |
| JP | 6-103696 A | 4/1994 |
| JP | 2005-167717 | 6/2005 |
| JP | 2005-167717 A | 6/2005 |

OTHER PUBLICATIONS

Japanese Office Action dated Mar. 15, 2011, with partial English translation.

* cited by examiner

*Primary Examiner* — Hirdepal Singh
(74) *Attorney, Agent, or Firm* — McGinn IP Law Group, PLLC

(57) ABSTRACT

An adaptive equalizer includes: an adaptive filter; and a control unit. The adaptive filter performs an adaptive equalization processing for an input signal modulated by a modulation method that produces a modulation signal with constant amplitude characteristics so as to make an amplitude of an equalized output signal constant. The control unit controls stop and execution of the adaptive equalization processing of the adaptive filter in accordance with characteristics of at least one of the input signal and the output signal.

19 Claims, 8 Drawing Sheets

ADAPTIVE EQUALIZER WITH FUNCTION OF STOPPING ADAPTIVE EQUALIZATION PROCESSING AND RECEIVER

BACKGROUND OF THE INVENTION

1. Field of the Invention

The present invention relates to a technique of adaptive equalizing radio signals such as a frequency modulated (FM) signal, and more specifically to an adaptive equalizer with a function of stopping an adaptive equalization processing.

2. Description of Related Art

In a radio broadcasting system such as an FM radio or a wireless communication system, a transmission signal is deteriorated due to multipath distortion or noises in a wireless transmission path. To that end, an equalizer for decoding the received transmission signal that is deteriorated after propagating through the wireless transmission path is used on the wireless receiver side. In general, a state of the wireless transmission path is uncertain on the receiver side. Further, a wireless receiver of high mobility should follow change in characteristics of the wireless transmission path. Thus, an adaptive equalizer capable of following a change in characteristics of the wireless transmission path has been used.

In general, the adaptive equalizer is configured by a digital filter such as an IIR (Infinite Impulse Response) filter or an FIR (Finite Impulse Response) filter, and an adaptation algorithm such as an LMS (Least Mean Square) algorithm or an NLMS (Normalized LMS) algorithm has been employed to optimize filter coefficients.

To optimize the filter coefficients based on the adaptation algorithm, a reference signal for estimating characteristics of the wireless transmission path is necessary. As one conceivable method, a training signal with a known signal pattern is sent earlier than an information signal and used as a reference signal to determine filter characteristics. As another method, a blind equalization method has been well known. The blind equalization method generates a reference signal from a received signal and thus does not need to previously send a training signal. Examples of the blind equalization method include a CMA (Constant Modulus Algorithm).

The CMA is an algorithm in general, which sets a statistical quantity regarding the filter output signal such as an envelope of a filter output signal and higher-order statistical quantity thereof as an index, and updates the filter coefficients to approximate the index to a target value. The CMA is effective for a modulation system where an amplitude of a modulation signal such as an FM (Frequency modulation) signal or PM (Phase modulation) signal is constant, in other words, a modulation signal has constant amplitude characteristics.

Japanese Unexamined Patent Application Publication No. 2005-167717 discloses an improved one of the CMA-based blind adaptive equalizer. To be specific, a multipath distortion eliminating filter is disclosed, which aims at eliminating multipath distortion of an FM signal or PM signal, and controls filter coefficients of a digital filter such that an error between an envelope of an input signal and an output of a digital filter (hereinafter referred to as "correction error") approximates to 0.

Further, Japanese Unexamined Patent Application Publication No. 2005-167717 describes that if it is difficult to converge the correction error to 0 in the case where correction error exceeds a predetermined threshold value, for example, in such a case that a delay of a multipath signal increases beyond the total delay time of delay elements in the multipath distortion eliminating filter, fluctuations of the filter coefficients are constrained by restricting the maximum value of the correction error. The filter operation can be stabilized based on the LMS algorithm if it is difficult to make a correction error converge to 0.

Further, as another configuration example of the multipath distortion eliminating filter, Japanese Unexamined Patent Application Publication No. 2005-167717 describes the configuration for stabilizing filter operations by approximating all tap factors of a digital filter to 0 if a correction error exceeds a predetermined threshold value (paragraphs [0065] to [0067]).

As described above, the adaptive equalizer (multipath distortion eliminating filter) as disclosed in Japanese Unexamined Patent Application Publication No. 2005-167717 determines a difficult situation in which the correction error between an envelope of an input signal and a digital filter output converges to 0 based on whether or not the correction error exceeds a predetermined threshold value. Further, the adaptive equalizer has a feature that, if the correction error exceeds a threshold value, an operational mode of the digital filter is changed to facilitate convergence of the correction error to 0. That is, additional processing is performed to facilitate convergence of the correction error to 0.

However, the adaptive equalizer as disclosed in Japanese Unexamined Patent Application Publication No. 2005-167717 continuously performs adaptive control of filter coefficients in response to an input signal before and after an operational mode of a digital filter is changed. This causes a problem that operational stability of the digital filter is not secured.

For example, input signal intensity is changed at a small interval, it is impossible to make the correction error to converge even through the CMA to approximate the correction error to 0, leading to unstable operations such as oscillations in filter coefficients.

In short, the adaptive equalization based on the CMA can adaptively configure a filter having characteristics opposite to characteristics of a wireless transmission path unless a factor of signal deterioration such as multipath distortion in a wireless transmission path, an interfering wave, and noise hinders estimation of a modulation signal of a constant amplitude from a received signal. However, if there is a factor of signal deterioration that hinders estimation of a modulation signal of a constant amplitude from a received signal, adaptive equalization processing is no longer performed stably through the CMA.

Japanese Unexamined Patent Application Publication No. 2005-167717 includes no description about configuration and operation to deal with an unstable behavior such as non-convergence and oscillations of filter coefficients of a digital filter if a factor of signal deterioration that hinders estimation of a modulation signal of a constant amplitude from a received signal.

SUMMARY

In one embodiment, there is provided an adaptive equalizer that includes: an adaptive filter; and a control unit. The adaptive filter performs an adaptive equalization processing for an input signal modulated by a modulation method that produces a modulation signal with constant amplitude characteristics so as to make an amplitude of an equalized output signal constant. The control unit controls stop and execution of the adaptive equalization processing of the adaptive filter in accordance with characteristics of at least one of the input signal and the output signal.

According to this configuration, for example, it is possible to determine an environment involving non-convergence, oscillation, or divergence of filter coefficients of the adaptive filter in accordance with characteristics of at least one of the input signal and the output signal, and stop the adaptive equalization processing of the adaptive filter under the determined environment. As a result, it is possible to prevent an output signal of the adaptive filter from deteriorating due to an unstable behavior such as oscillations of filter coefficients, and to improve an operational stability of the adaptive filter.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

Figure 1:
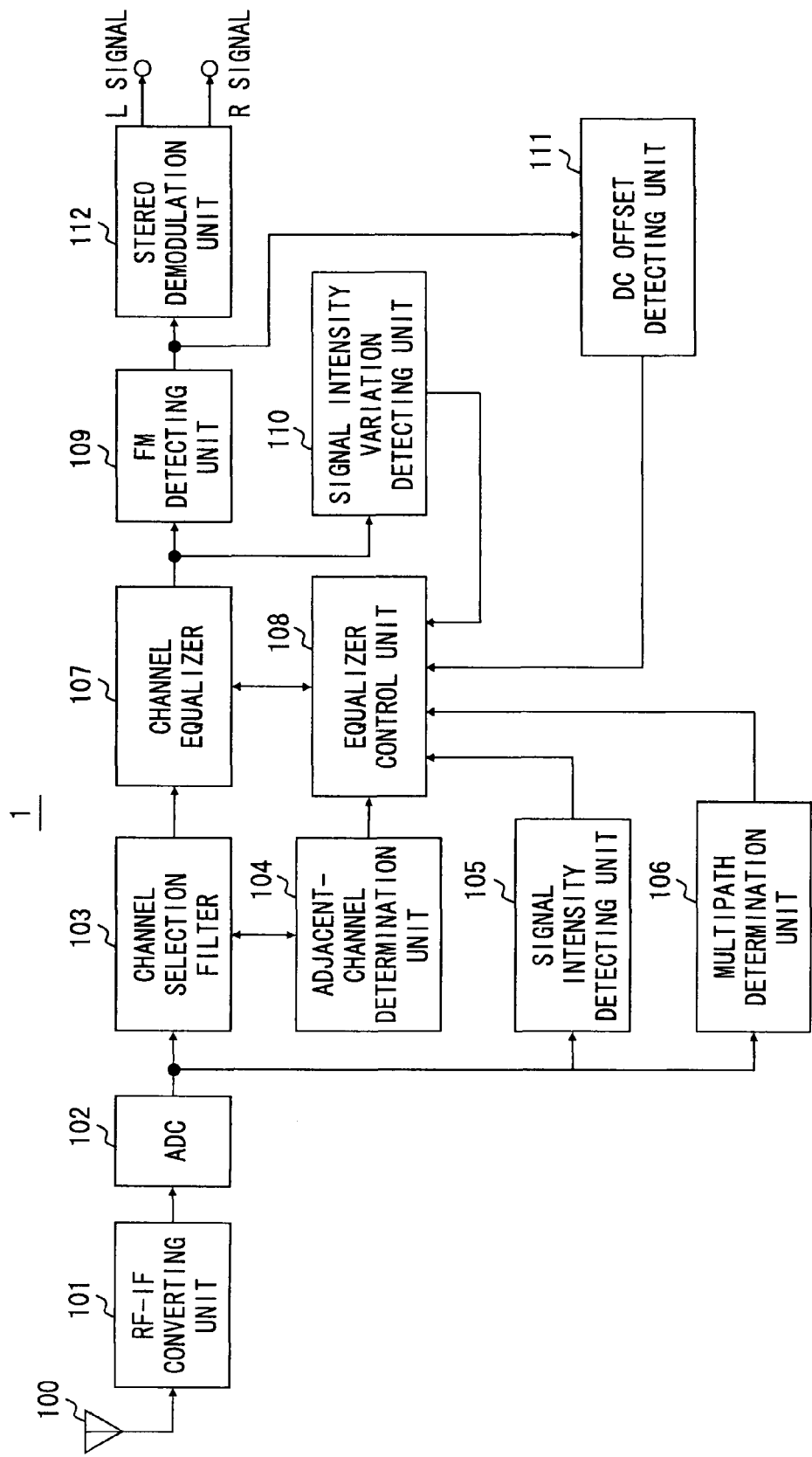
FIG. 1 is a block diagram of an FM receiver according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Detailed description is given of embodiments of the present invention below with reference to the accompanying drawings. The same components are denoted by identical reference numerals throughout the drawings, and repetitive description is omitted if not necessary for clear description. Incidentally, the following embodiments of the present invention relate to an FM receiver for receiving an FM signal that is frequency-modulated by a sound signal with an encoded carrier.

First Embodiment

FIG. 1 shows the configuration of an FM receiver 1 according to a first embodiment of the present invention. Referring first to FIG. 1, components of the FM receiver 1 are described. In FIG. 1, an RF-IF converting unit 101 receives an RF signal through an antenna 100, and combines the input RF signal and a signal generated with a local oscillator (not shown) to generate an IF signal.

The IF signal generated with the RF-IF converting unit 101 is converted into a digital signal by an A/D converter 102 and input to a channel selection filter 103. The channel selection filter 103 is a band pass filter to extract a desired channel from the input signal.

The IF signal subjected to bandwidth selection with the channel selection filter 103 (hereinafter referred to as "FM signal") is input to the channel equalizer 107. The channel equalizer 107 is an adaptive equalizer to compensate for signal distortion of an FM signal due to multipath delay wave, interfering wave, and noise. The equalizer performs adaptive equalization processing for the purpose of stabilizing an amplitude of an output signal. The channel equalizer 107 is configured by, for example, a FIR filter to optimize filter coefficients based on an LMS algorithm. Incidentally, a specific configuration example of the channel equalizer 107 is described later in detail. The FM signal equalized by the channel equalizer 107 (hereinafter referred to as "equalized FM signal") is input to an FM detection unit 109. The FM detection unit 109 performs FM detection, that is, demodulates a sound signal encoded through frequency-voltage conversion. A stereo demodulation unit 112 demodulates the encoded sound signal to stereo sound signals (L signal and R signal) and outputs the stereo sound signals.

An adjacent-channel determination unit 104 determines whether an adjacent-channel signal mixes into the FM signal, and selects a transmission bandwidth of the channel selection filter 103 in accordance with a determination result. For example, whether or not the adjacent-channel signal mixes into the FM signal can be determined by extracting an adjacent-channel band through a band pass filter, full-wave rectifying the extracted signal, calculating time mean intensity of the extracted signal, and then determining whether or not the thus-calculated signal intensity exceeds a threshold value. If signal intensity of an adjacent channel exceeds a predetermined threshold value, it is likely that an adjacent-channel signal is included in an FM signal subjected to bandwidth selection with the channel selection filter 103. Thus, a transmission bandwidth of the channel selection filter 103 is decreased. On the other hand, if the signal intensity of the adjacent channel is below a predetermined threshold value, a transmission bandwidth of the channel selection filter 103 is increased. Incidentally, the intensity may be compared with plural threshold values to select a desired transmission bandwidth of the channel selection filter 103 from three or more levels. Further, whether or not the adjacent-channel signal is included can be determined by another method.

The signal intensity detecting unit 105 detects signal intensity of the FM signal. To be specific, the FM signal may be full-wave rectified to calculate time mean intensity.

The multipath determination unit 106 detects signal intensity of a multipath signal. In addition, the multipath determination unit 106 may detects a delay spread of the multipath signal. To be specific, the multipath determination unit 106 extracts a pilot signal from the received signal through a band pass filter, and detects signal intensity and delay spread of the pilot signal.

A signal intensity variation detecting unit 110 detects variations in signal intensity of the equalized FM signal output from the channel equalizer 107. The FM signal has constant amplitude characteristics, so it is possible to determine a level of convergence through adaptive processing of the channel equalizer 107 in accordance with variations in signal intensity of the equalized FM signal. That is, if variations in signal intensity of the equalized FM signal are too large, it is supposed that the FM signal is not equalized as expected, and operations of the channel equalizer 107 are unstable.

A DC offset detecting unit 111 detects DC offset components of an output signal from the FM detection unit 109. An amplitude of DC offset of the signal subjected to the FM detection means an amplitude of offset from a channel center frequency of an equalized FM signal frequency. That is, a large absolute value of the DC offset means that a signal having a frequency that largely deviates from a channel center frequency such as an adjacent-channel signal is demodulated with the FM detection unit 108.

The equalizer control unit 108 determines whether to execute or stop adaptive equalization processing of the channel equalizer 107 based on measurements or determination results from the above adjacent-channel determination unit 104, the signal intensity detecting unit 105, the multipath determination unit 106, signal intensity variation detecting unit 110, and the DC offset detecting unit 111 to output a control signal (hereinafter referred to as "equalizer control signal") to the channel equalizer 107. To be specific, it is determined whether to execute or stop adaptive equalization processing of the channel equalizer 107 in accordance with measurements of an adjacent-channel signal or a threshold value determination result based on the measurements, signal intensity of the FM signal or a threshold value determination result based on the signal intensity, signal intensity of a multipath signal or a threshold value determination result based on the signal intensity, variations in signal intensity of the equalized FM signal or a threshold value determination result based on the variations, and an amount of DC offset components in an output signal subjected to FM detection or a threshold value determination result based on the amount. A processing of determining whether to execute or stop adaptive equalization processing of the equalizer control unit 108 is described in detail below.

The above channel equalizer 107 converges filter coefficients in the channel equalizer 107 to predetermined values if the equalizer control signal instructs to stop the adaptive equalization processing. To be specific, one coefficient among the filter coefficients is made to converge to "1", and the other coefficients are made to converge to "0". As a result of converging the filter coefficients this way, the channel equalizer 107 gives a delay to the input FM signal and outputs the input FM signal without modification, and thus does not function as an adaptive equalizer. On the other hand, if the equalizer control signal instructs to execute adaptive equalization processing, the channel equalizer 107 cancels convergence the filter coefficients to "1" or "0" and adaptively update the filter coefficients.

Figure 2:
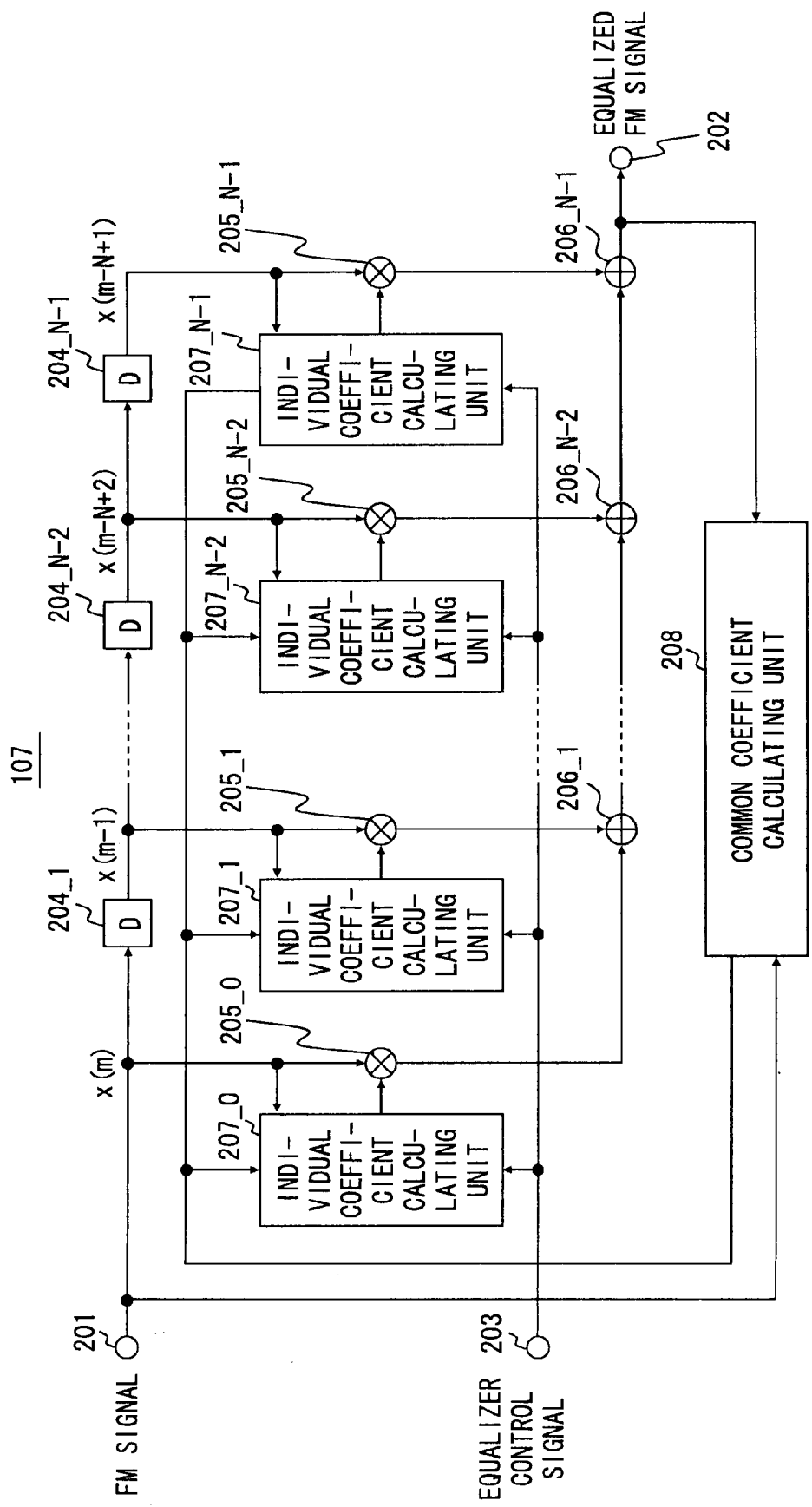
FIG. 2 is a block diagram of a channel equalizer of the first embodiment.

Subsequently, a specific configuration example of the channel equalizer 107 is described with reference to FIGS. 2 to 6. FIG. 2 is a block diagram of a configuration example of the channel equalizer 107. The channel equalizer 107 of FIG. 2 employs a general transversal type FIR filter as an adaptive digital filter, and updates filter coefficients of the FIR filter based on the LMS algorithm every sampling period. In FIG. 2, an input terminal 201 is an input terminal for the FM signal, and receives the FM signal from the channel selection filter 103. An input terminal 203 is an input terminal for the equalizer control signal, and receives the equalizer control signal from the equalizer control unit 108. An output terminal 202 is an output terminal for the equalized FM signal.

N-1 delay devices 204_1 to 204_N-1 each give a delay of predetermined sampling periods to the input FM signal and output the delay signals. The cascaded connected delay devices 204_1 to 204_N-1 constitute a shift-memory, and values stored in the delay devices 204_1 to 204_N-1 are shifted per sampling period.

N multipliers 205_0 to 205_N-1 multiply signals x(m) to x(m-N+1) at N tap points between the input terminal 201 and the delay devices 204_1 to 204_N-1 by filter coefficients C (m, 0) to C (m, N-1). The N values obtained through the multiplication by the filter coefficients are added by N-1 adders 206_1 to 206_N-1 and output to the output terminal 202. That is, the N multipliers 205_0 to 205_N-1, and the N-1 adders 206_1 to 206_N-1 perform convolutional encoding of the input FM signals x(m) to x(m-N+1) and the filter coefficients C (m, 0) to C (m, N-1).

N individual coefficient calculating units 207_0 to 207_N-1 calculate filter coefficients C (m, 0) to C (m, N-1). To be specific, N individual coefficient calculating units 207_0 to 207_N-1 each calculates a new filter coefficient based on an update value input from a common coefficient calculating unit 208, a filter coefficient before one sampling period and a sampling value of the input FM signal before one sampling period.

A common coefficient calculating unit 208 calculates the update value of the filter coefficient based on the LMS algorithm and outputs the value to the individual coefficient calculating units 207_0 to 207_N-1. The LMS algorithm executed by the individual coefficient calculating units 207_0 to 207_N-1 and the common coefficient calculating unit 208 is expressed by Expression (1).

$$\vec{h}(m+1) = \vec{h}(m) + \mu\, e(m)\, \vec{u}(m) \qquad (1)$$

In Expression (1), a vector h(m) is a vector including N filter coefficients C (m, 0) to C (m, N-1) at an m-th sample and is described from Expression (2). Further, the vector u(m) is an input signal vector representing tapped FM signals x(m) to x(m-N+1) and is derived from Expression (3). Further, p represents a scalar value called a "step size". Further, e(m) represents an error amount of a filter coefficient expressed by Expression (4).

$$\vec{h}(m) = \begin{pmatrix} C(m, 0) \\ C(m, 1) \\ \vdots \\ C(m, N-1) \end{pmatrix} \qquad (2)$$

$$\vec{u}(m) = \begin{pmatrix} x(m) \\ x(m-1) \\ \vdots \\ x(m-N+1) \end{pmatrix} \qquad (3)$$

$$e(m) = d(m) - V(m) \qquad (4)$$

In Expression (4), d(m) represents a reference signal. In this embodiment, a target value of an envelope amplitude calculated based on an input FM signal is a reference signal d(m) by the utilization of the fact that the FM signal has a constant amplitude. The common coefficient calculating unit 208 calculates the reference signal d(m) based on the input FM signal, and calculates an error amount e(m) based on a difference between the reference signal d(m) and an envelope amplitude V(m) derived from the filter output value. Moreover, the common coefficient calculating unit 208 outputs a value calculated by multiplying the error amount e(m) by a predetermined step size μ to the individual coefficient calculating units 207_0 to 207_N-1.

As described above, adaptive equalization processing of the channel equalizer 107 is stopped in accordance with an equalizer control signal output from the equalizer control unit 108. The configuration of the individual coefficient calculating units 207_0 to 207_N-1 to stop the adaptive equalization processing of the channel equalizer 107 in accordance with an equalizer control signal is described next. In the case of stopping the adaptive equalization processing, a filter coefficient output from one of the N individual coefficient calculating units 207_0 to 207_N−1 is made to converge to "1", and filter coefficients output from the remaining units, that is, the N−1 individual coefficient calculating units are made to converge to "0". The individual coefficient calculating unit conveying the factor to "1" may be any one of the N individual coefficient calculating units. The following description is directed to the case where a filter coefficient calculated by the individual coefficient calculating unit 207_0 is made to converge to "1" and filter coefficients calculated by the other individual coefficient calculating units are made to converge to "0" by way of example.

Figure 3:
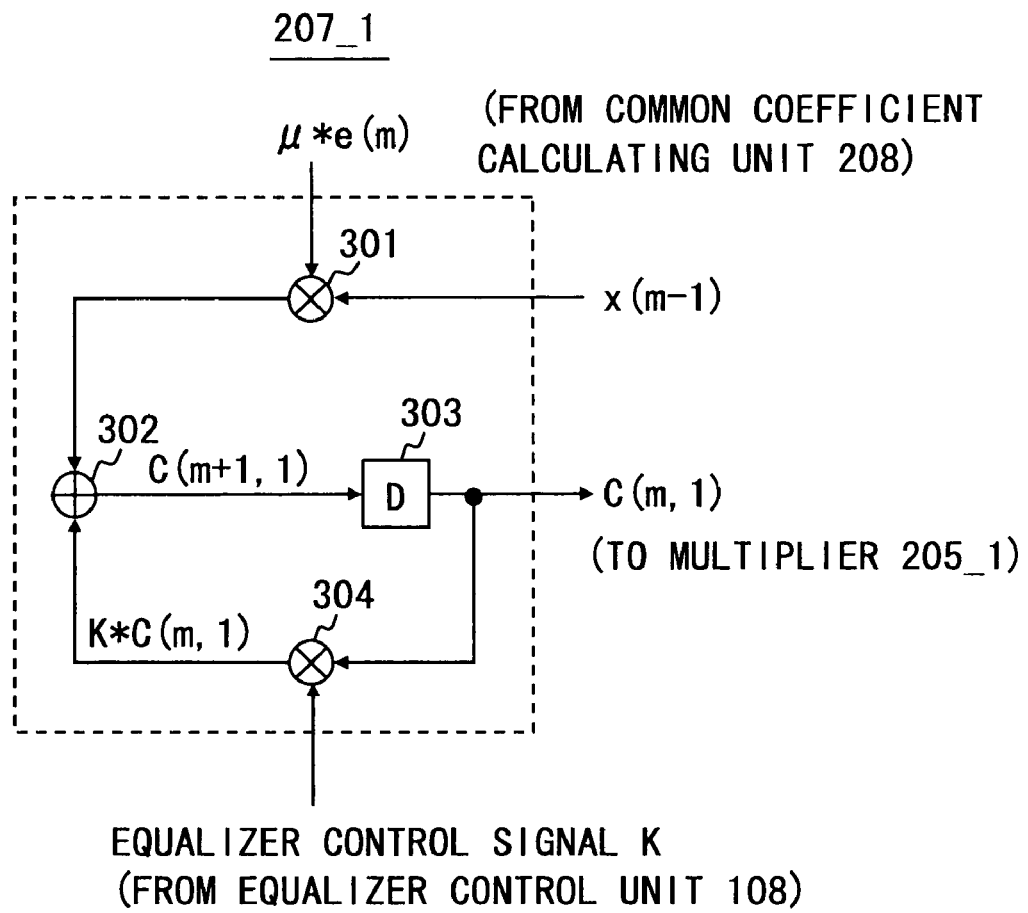
FIG. 3 shows a configuration example of an individual coefficient calculating unit provided in a channel equalizer according to a first embodiment of the present invention.

FIG. 3 shows a configuration example of the individual coefficient calculating unit 207_1 that approximates a filter coefficient to "0" at the time of stopping the adaptive equalization processing. The multiplier 301 multiplies a scalar value μe(m) input from the common coefficient calculating unit 108 by a sampling value x(m−1) of an input signal. The multiplier 304 multiplies a filter coefficient given a delay of one sampling period with the delay device 303 by the equalizer control signal K. The adder 302 adds an output value from the multiplier 302 and an output value from the multiplier 304, and outputs an update value C (m+1, 1) of the filter coefficient. That is, the update value C (m+1, 1) of the filter coefficient output from the multiplier 302 is derived from Expression (5).

$$C(m+1,1)=K\,C(m,1)+\mu\,e(m)x(m-1) \quad (5)$$

If the adaptive equalization processing is performed, the equalizer control signal K output from the equalizer control unit 108 is set to 1. In this case, Expression (5) shows an updated algorithm similar to Expression (1) above. On the other hand, if the adaptive processing is stopped, the equalizer control signal K output from the equalizer control unit 108 is set larger than 0 and smaller than 1 (0<K<1), and an output signal value of the common control unit 208 is set to 0. The output signal value of the common control unit 208 can be set to 0 by setting, for example, step size μ to 0. Thus, a filter coefficient during a period where the adaptive equalization processing is stopped gradually decreases to converge to 0 upon each update. The individual coefficient calculating units 207_2 to 207_N−1 that should approximate the filter coefficient to "0" at the time of stopping the adaptive equalization processing may be configured as illustrated in FIG. 3.

Figure 4:
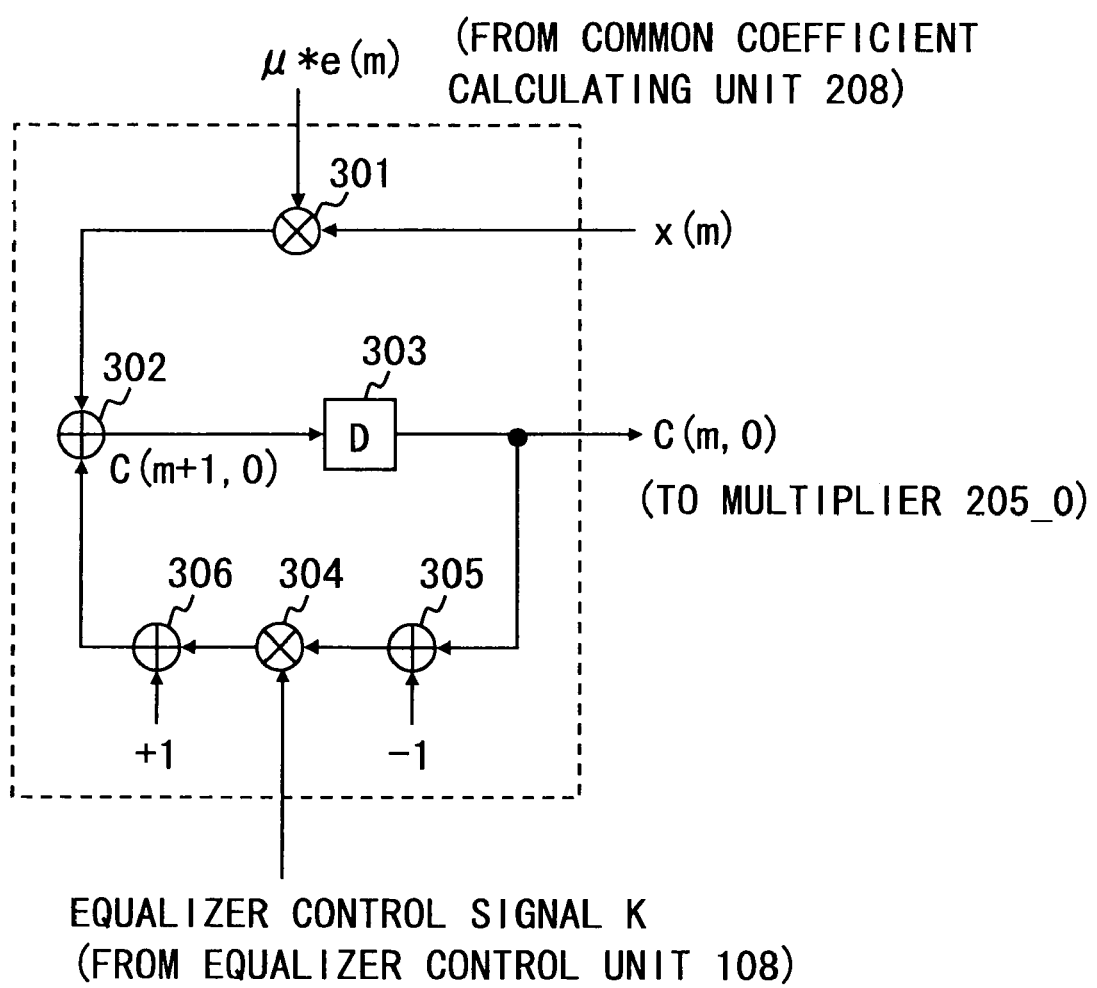
FIG. 4 shows a configuration example of the individual coefficient calculating unit provided in the channel equalizer of the first embodiment.

FIG. 4 shows a configuration example of the individual coefficient calculating unit 207_0 that makes a filter coefficient converge to "1" at the time of stopping the adaptive equalization processing. The individual coefficient calculating unit 207_0 of FIG. 4 differs from the individual coefficient calculating unit 207_1 of FIG. 3 in that a −1 adder 305 and a +1 adder 306 are provided upstream of and downstream of the multiplier 304. In this example, an update value C(m+1, 0) of the filter coefficient output from the multiplier 302 is expressed by Expression (6). That is, at the time of stopping the adaptive equalization processing, if the equalizer control signal K is larger than 0 and smaller than 1 (0<K<1), and the step size μ is 0, the filter coefficient gradually approximate to 1 upon each update.

$$C(m+1,0)=K\{C(m,0)-1\}+\mu\,e(m)x(m)+1 \quad (6)$$

According to the configuration of FIGS. 3 and 4, the filter coefficients can gradually converge to a target value at the time of stopping the adaptive equalization processing of the channel equalizer 107, instead of instantly changing the filter coefficients to 1 or 0. Thus, large discontinuous variations of an output signal from the channel equalizer 107 can be suppressed, making it possible to prevent noise generated in a stereo sound signal due to such variations.

Incidentally, in the above configuration of FIGS. 3 and 4, the common filter control signal K is input to the individual coefficient calculating unit 207_0 and the individual coefficient calculating unit 207_1, but a different signal value may be input. Further, even if an adaptive filter that performs complex number operation is used as the channel equalizer 107, a complex arithmetic unit is used as each operation unit of FIGS. 3 and 4 to thereby apply these configurations. That is, the configuration of FIG. 3, which makes the filter coefficient converge to 0 at the time of stopping the adaptive equalization processing can approximate a real part and an imaginary part of the filter coefficient to 0. Further, the configuration of FIG. 4, which makes the filter coefficient converge to 1 at the time of stopping the adaptive equalization processing can converge a real part of the filter coefficient to 1 and an imaginary part to 0.

Figure 5:
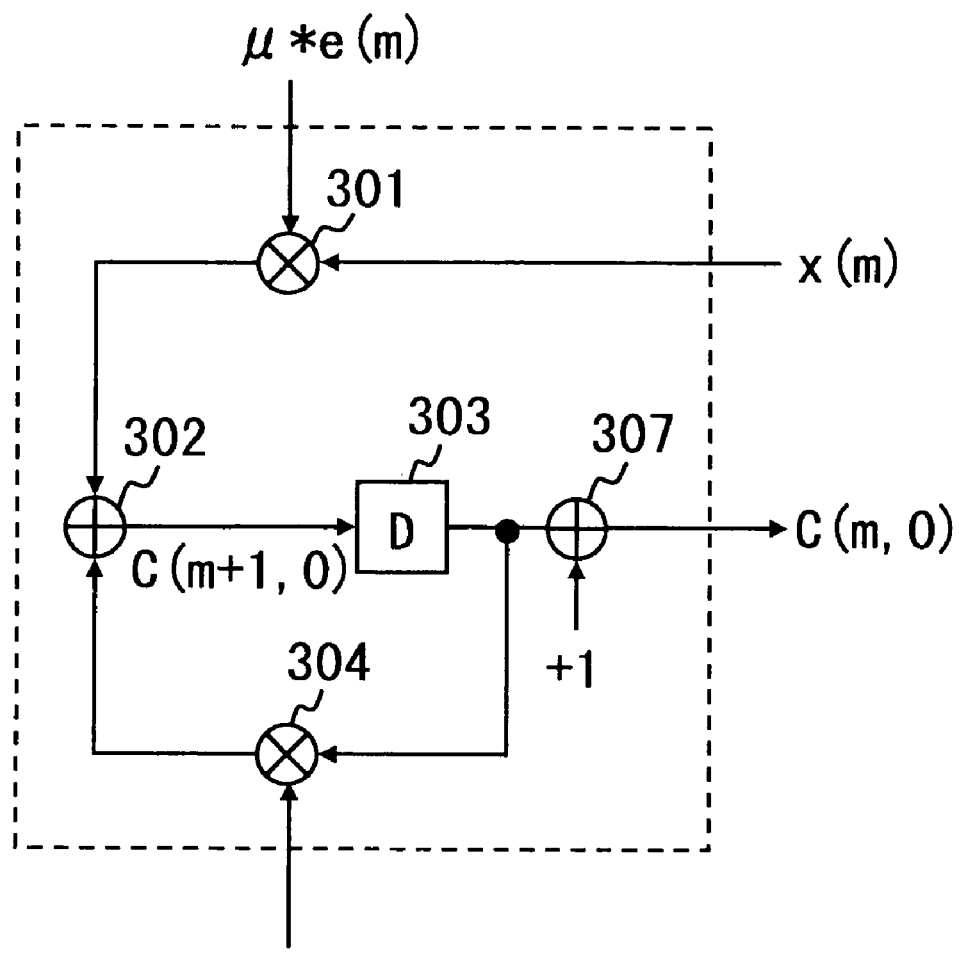
FIG. 5 shows a configuration example of the individual coefficient calculating unit provided in the channel equalizer of the first embodiment.

Next, another configuration example of the individual coefficient calculating unit is described. FIG. 5 shows another configuration example of the individual coefficient calculating unit 207_0 that makes the filter coefficient converge to "1" at the time of stopping the adaptive equalization processing. The configuration of FIG. 5 adds a fixed value of 1 to the filter coefficient by the adder 307, and the other configuration is the same as that of FIG. 3. With such configuration, the adaptive equalization processing can be also performed, and the filter coefficient converges to 1 at the time of stopping the adaptive equalization processing (0<K<1) depending on a value added by the adder 307.

Figure 6:
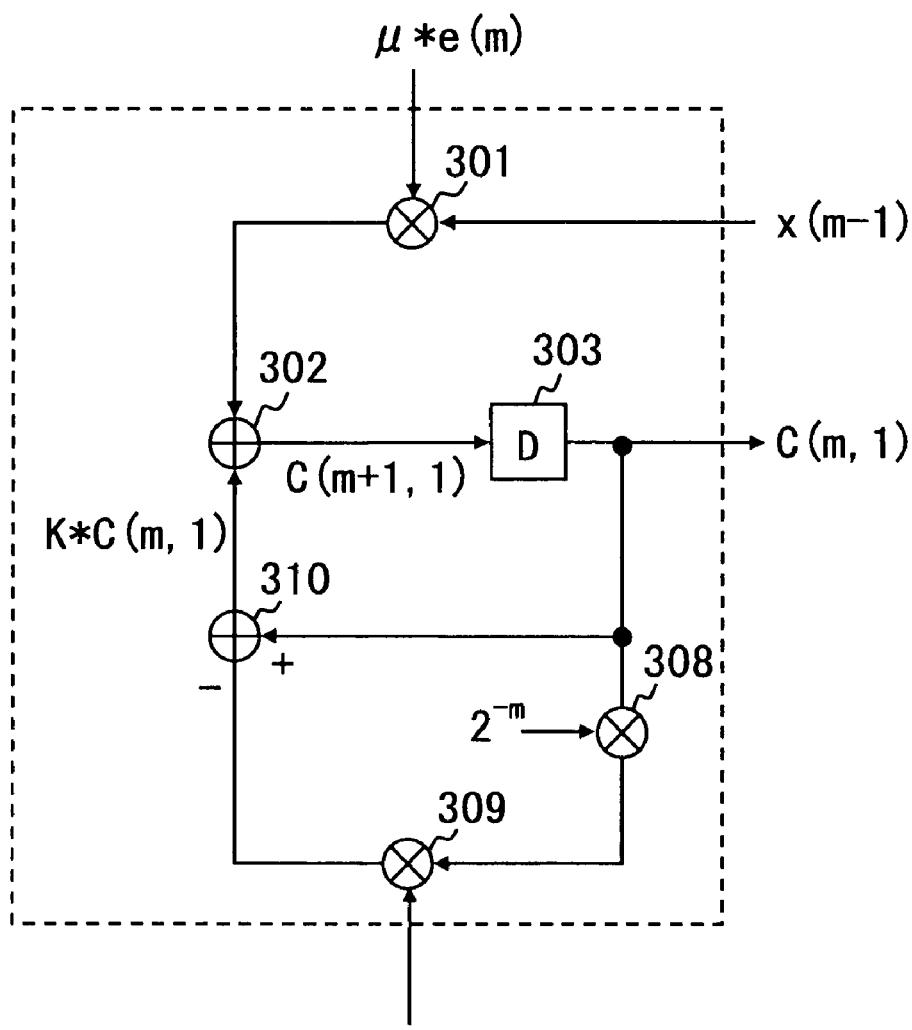
FIG. 6 shows a configuration example of the individual coefficient calculating unit provided in the channel equalizer of the first embodiment.

FIG. 6 shows another configuration example of the individual coefficient calculating unit 207_1 that makes the filter coefficient converge to "0" at the time of stopping the adaptive equalization processing. In the configuration of FIG. 6, the equalizer control signal L is a binary logic signal of 0 or 1. Further, the multiplier 308 multiplies the filter coefficient by $2^{-m}$ before one sampling period. Here, m represents a positive integer. Such multiplication can be performed through signed m-bit shift operation.

The multiplier 309 multiplies the equalizer control signal L by an output from the multiplier 308. Here, L is 0 or 1, so such multiplication can be replaced by selective operation or AND operation. The adder 310 calculates a difference between an output value of the multiplier 309 and a filter coefficient before one sampling period. An update value C(m+1, 1) of the filter coefficient in the above configuration is expressed by Expression (7). That is, the configuration of FIG. 6 differs from the configuration of FIG. 3 in that a multiplier factor K is limited to $1-2^{-m}$. L=0 corresponds to K=1, and L=1 corresponds to 0<K<1. In the configuration of FIG. 6, the number of multiplying processings is not larger than that of FIG. 3. The configuration of FIG. 6 is especially effective for realizing an adaptive filter through fixed-point calculation.

$$C(m+1,1)=(1-L\times 2^{-m})C(m,1)+\mu\,e(m)x(m-1) \quad (7)$$

Figure 7:
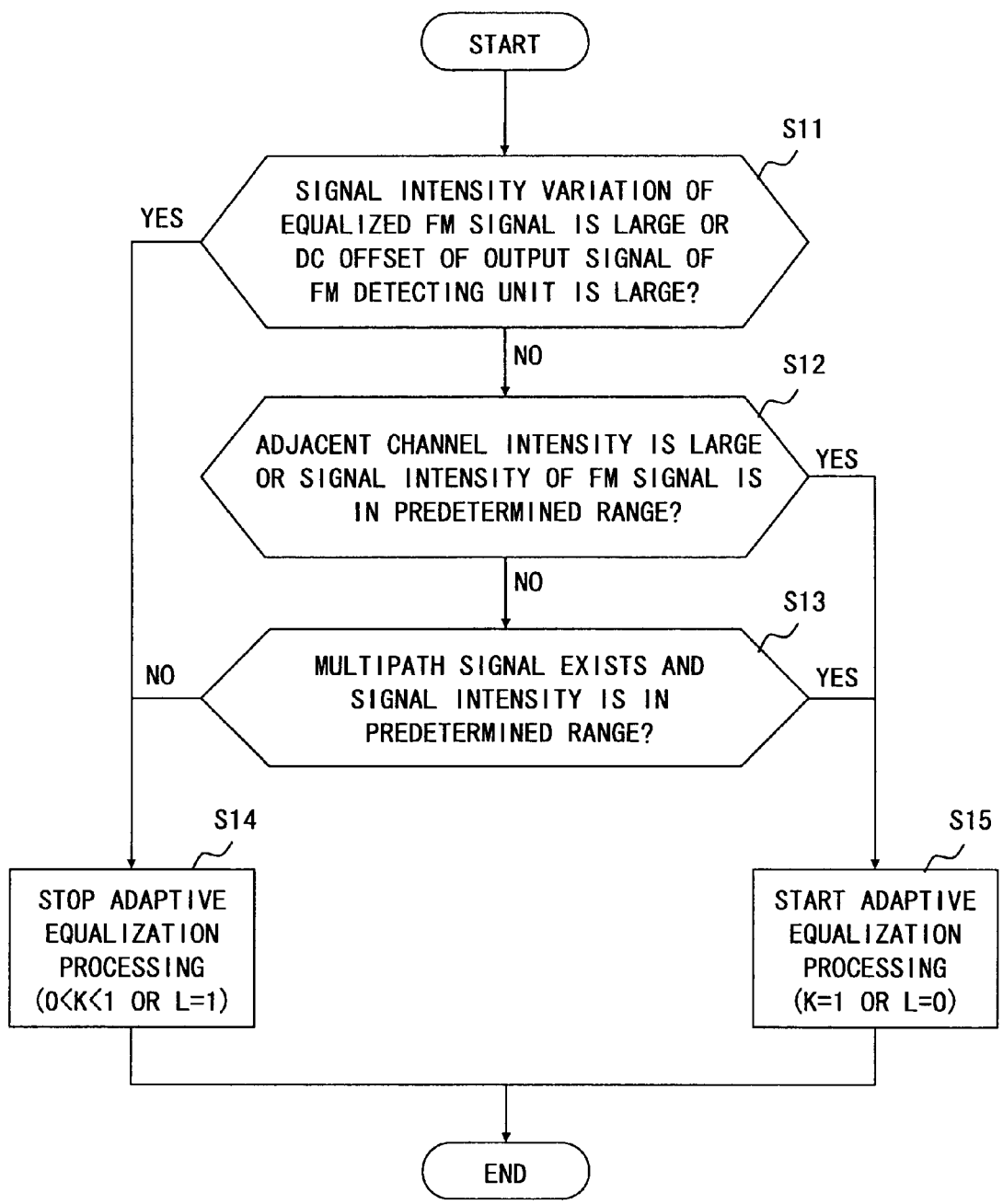
FIG. 7 is a flowchart of operations of an equalizer control unit provided in an FM receiver of the first embodiment.

Subsequently, how to control the adaptive equalization processing of the channel equalizer 107 by the equalizer control unit 108 is described with reference to a flowchart of FIG. 7. FIG. 7 shows an example of a control sequence periodically executed in the equalizer control unit 108. In step S11, if variations in equalized signal intensity of the FM signal detected by the signal intensity variation detecting unit 110 exceed a predetermined threshold value, that is, an equalized FM signal that needs to have constant amplitude is unstable, the adaptive equalization processing of the channel equalizer is preferentially stopped irrespective of the other conditions (step S14). Further, if a DC offset detected with the DC offset detecting unit 111 is large, that is, if the FM detection unit 109 demodulates a signal having a frequency that largely deviates from a channel center frequency, the adaptive equalization processing of the channel equalizer is preferentially stopped (steps S11 and S14).

Next, in step S12, if conditions of stopping the adaptive equalization processing of step S11 are not met and signal intensity of an adjacent-channel signal detected with the adjacent-channel determination unit 104 exceeds a predetermined threshold value, the adaptive equalization processing is preferentially carried out regardless of the signal intensity of a multipath signal detected with the multipath determination unit 106 (step S15). Further, if signal intensity of the FM signal detected with the signal intensity detecting unit 106 is in a predetermined range, the adaptive equalization processing is preferentially carried out regardless of the signal intensity of a multipath signal detected with the multipath determination unit 106 (steps S12 and S15).

If both of the conditions of stopping the adaptive equalization processing of step S11 and the conditions of executing the adaptive equalization processing of step S12 are not met, it is determined whether to stop or perform the adaptive equalization processing based on determination in step S13. To be specific, if the signal intensity of a multipath signal detected with the multipath determination unit 106 is below a predetermined threshold value, the channel equalizer 107 carries out the adaptive equalization processing. If the intensity is above a predetermined threshold value, the adaptive equalization processing is stopped.

Figure 8:
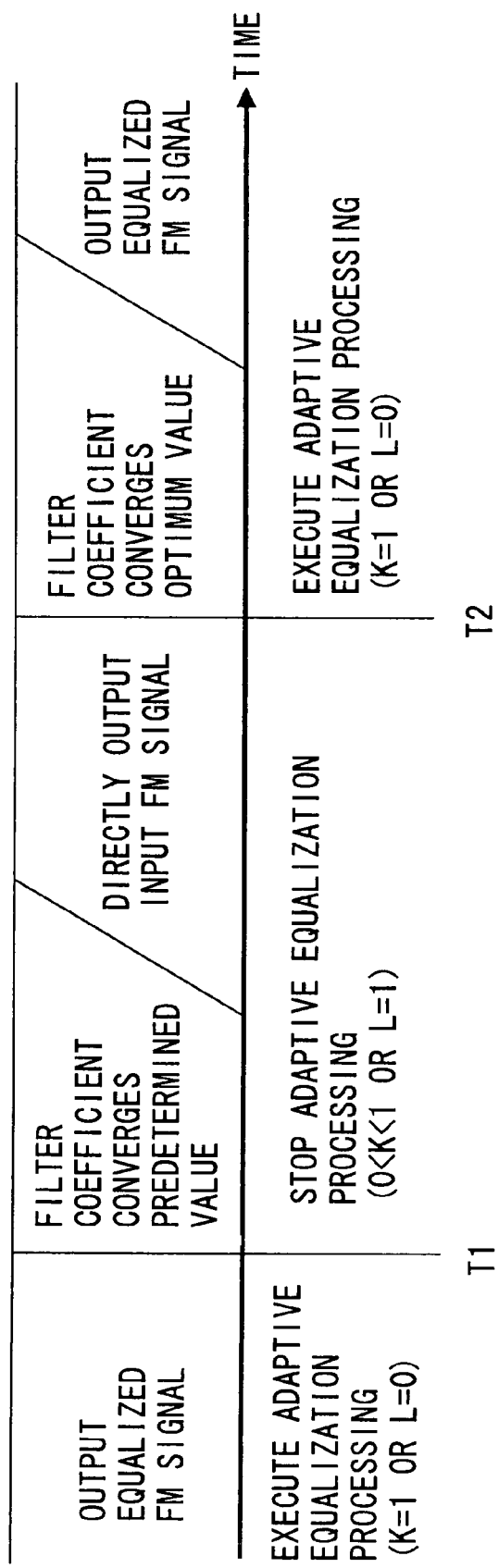
FIG. 8 illustrates how to control adaptive equalization processing executed by the FM receiver of the first embodiment.

FIG. 8 is a time chart of an temporary transit example in the case of repeatedly executing and stopping the adaptive equalization processing of the channel equalizer 107 under the control of the equalizer control unit 108. In FIG. 8, the adaptive equalization processing is stopped as a result of determination of the equalizer control unit 108 at time T1. Hence, the filter coefficients converge to a predetermined values (0 or 1) from time T1 onward, and after the convergence of the filter coefficients, the delay input FM signal is directly output to the channel equalizer 107 as it is. Subsequently, at time T2, the adaptive equalization processing is performed as a result of determination with the equalizer control unit 108. Hence, from time T2 onward, the filter coefficients converge to the optimized values with an aim to set an amplitude of the equalized FM signal constant.

An interval at which the equalizer control unit 108 performs determination, that is, at which the control sequence of FIG. 7 is executed should be determined based on a period necessary for the filter coefficients of the channel equalizer 107 converge to a target value and an interval at which a phenomenon that requires control of the equalizer occurs. The period necessary for the filter coefficient to converge to a target value and the interval at which the control sequence is executed are considered below.

The period necessary for the filter coefficient to converge to a target value at the time of stopping the adaptive equalization processing is determined by the prefix $K^n$ of the multiplier factor K as represented by Expression (5). The larger the value K, the longer the period necessary for convergence. Here, n represents a sampling number. Here, $K=1-\epsilon$ ($0<C<1$), and the sampling number n is set such that $K^n$ is smaller than $\epsilon$, that is, set to satisfy Expression (8) below.

$$(1-\epsilon)^n < \epsilon \quad (8)$$

If $\epsilon$ is much smaller than 1, the left side of Expression (8) is binomial expanded; if the term of second or more orders of $\epsilon$ is ignored, n that satisfies Expression (8) is substantially the inverse of $\epsilon$ as apparent from the expression. That is, if n exceeds $1/\epsilon$, the filter coefficient is smaller than $n \times \epsilon$. Thus, if $\epsilon$ is too small, it is expected to approximate the filter coefficient to substantially 0. For example, if $\epsilon=2^{-m}$, and a value of the multiplier factor K is $1-2^{-m}$, it is expected that the filter coefficient converges to substantially 0 after sampling number n exceeding $1/\epsilon=2^m$.

To elaborate, the FM signal is processed while an intermediate frequency of 10.7 MHz is converted into a lower intermediate frequency. Thus, assuming that an intermediate frequency of 1 MHz is used, a clock having a frequency 4 times higher than the intermediate frequency, that is, 4 MHz is used for sampling of the IF signal, and m=12, the filter coefficient supposedly converges to substantially 0 in a period corresponding to the number of sampling processings $2^{12}$, that is, after the elapse of about 1 millisecond from when the adaptive equalization processing is stopped.

Incidentally, a period necessary for convergence of the filter coefficient needs to be short enough to prevent form outputting noise to a demodulated sound signal. Considering a convergence period of the adaptive filter, the period is desirably approximately 10 microseconds. On the other hand, considering how to follow multipath null due to Doppler shift of an FM signal received by a mobile device, a convergence period of more than 10 milliseconds is not desirable. As described above, a value of the multiplier factor K or power m is determined in consideration of the convergence period of the filter coefficient; for example, a system may be designed such that a filter coefficient converges within a period at which a control sequence for controlling the equalizer is executed. Incidentally, the above consideration is given by way of example, and the system may be designed such that a convergence period of the filter coefficient exceeds a period at which the control sequence is executed.

Subsequently, detailed description is given of beneficial effects attained by performing and stopping the adaptive equalization processing under the control of the channel equalizer 107 and the equalizer control unit 108. The adaptive equalizer as disclosed in Japanese Unexamined Patent Application Publication No. 2005-167717 continuously executes adaptive control of filter coefficients in accordance with an input signal before and after an operational mode of a digital filter is changed. This results in a problem that operational stability of the digital filter is not secured. Further, the adaptive equalizer as disclosed in Japanese Unexamined Patent Application Publication No. 2005-167717 aims at eliminating multipath distortion, and neither considers deterioration of an input signal due to the other factors such as interference of the adjacent channel nor determines an influence of a multipath and an influence of adjacent channel interference in order of priority.

In contrast, according to the FM receiver 1 of this embodiment, the equalizer control unit 108 evaluates reception environments of the FM receiver 1 based on variations in signal intensity of the FM signal, multipath signal intensity, adjacent channel signal intensity, and equalized signal intensity of the FM signal, and a DC offset of the FM detection signal to determine whether to stop or execute the adaptive equalization processing of the channel equalizer 107 based on the evaluation result. With the above configuration, even in such environments that non-convergence, oscillations, or divergence of filter coefficients of the channel equalizer 107 occurs due to disturbance elements other than the multipath, the adaptive equalization processing can be stopped. Hence, it is possible to prevent an unstable equalized FM signal from being output from the channel equalizer 107 due to an unstable behavior of the channel equalizer 107 resulting from the disturbance elements other than the multipath. Further, it is possible to prevent noise that sounds unusual on human ears being output from the stereo demodulation unit 112 due to unstable equalized FM signals.

Further, as shown in the flowchart of FIG. 7, the equalizer control unit 108 prioritizes and determines plural measurements for evaluating reception environments of the FM receiver 1. That is, the equalizer control unit 108 executes a determination based on the equalized signal intensity of the FM signal variation and a determination based on DC offset after the FM detection in priority to a determination based on a determination of the signal intensity of a multipath signal. As a result, it is possible to detect an unstable adaptive processing of the channel equalizer 107 regardless of the multipath signal, so the channel equalizer 107 can be promptly shifted to a stable state.

Further, the equalizer control unit 108 executes based on the signal intensity of the adjacent-channel signal and signal intensity of the FM signal in priority to a determination based on the the signal intensity of a multipath signal. That is, if the adjacent-channel signal is included in the FM signal to be modulated or if the signal intensity of the FM signal exceeds a predetermined threshold value, the channel equalizer 107 performs adaptive equalization processing irrespective of existence of the multipath signal. The adaptive equalization processing of the FM signal is effective not only for compensating for multipath distortion but also for restoring the FM signal deteriorated by a general factor of signal deterioration to the original FM signal, so even if the multipath signal is included, the adaptive equalization processing can be continued through the operation of the equalizer control unit 108, and quality of the demodulated signal can be improved.

Further, the configuration illustrated in FIGS. 2 to 6 is employed to prevent increase in operational amounts of the channel equalizer 107 necessary for switchably execute and stop the adaptive equalization processing of the channel equalizer 107, so an increase in integration scale and processing load of the channel equalizer 107 can be suppressed.

Other Embodiments

The determination flow of the equalizer control unit 108 of the first embodiment as shown in FIG. 7 is described for illustrative purposes. That is, a combination and priority of determination conditions in the control sequence with the equalizer control unit 108 are not uniquely determined, and various modifications can be employed to stabilize operations of the channel equalizer 107.

For example, in the flowchart of FIG. 7, if a DC offset of the output signal of the FM detection unit 109 detected with the DC offset detecting unit 111 is large, the adaptive equalization processing of the channel equalizer 107 is stopped. The determination conditions are changed, and determination based on the signal intensity of the FM signal detected with the signal intensity detecting unit 105 is performed in combination, with the result that if the intensity of the FM signal is small and a DC offset after FM detection is large, the adaptive equalization processing of the channel equalizer 107 can be stopped.

Further, as another example, the determination of the signal intensity of a multipath signal in the flowchart of FIG. 7 and the determination of the signal intensity variation of the signal output from the channel equalizer 107 may be performed in combination. These processings are combined to stop and perform the adaptive equalization processing under control to thereby more precisely control stability if the multipath signal is included in the FM signal.

The optimum combination and priority of the determination condition of the equalizer control unit 108 vary depending on the environments of the FM receiver 1. Therefore, the combination and priority of the determination conditions of the equalizer control unit 108 may be determined based on measurements under actual use environments and after it is confirmed whether or not an erroneous operation occurs.

Further, the first embodiment describes the example where the present invention is applied to the FM receiver. However, the present invention is effective for a device that receives a signal modulated by a modulation system where a modulation signal has a constant amplitude, to be specific, a phase modulation (PM), and FSK (Frequency Shift Keying) and PSK (Phase Shift Keying) as a digital modulation method.

Further, additional determination conditions such as signal intensity of an adjacent-channel signal or a DC offset after the FM detection are used in combination with determination conditions such as an influence of the multipath signal as in the control sequence of FIG. 7, and these determination conditions are prioritized for determination. This is effective for configurations other than the configuration to stop the adaptive equalization processing of the channel equalizer 107 in accordance with the determination result. For example, the above is effective for a configuration to switch operational modes of the channel equalizer 107 in accordance with the determination result. To be specific, it is possible to switch an operational mode that allows large variations of the filter coefficients each time the filter coefficients are updated in accordance with the determination result of the equalizer control unit 108 and an operational mode that suppresses variations in filter coefficients each time the filter coefficients are updated.

It is apparent that the present invention is not limited to the above embodiments, but may be modified and changed without departing from the scope and spirit of the invention.

What is claimed is:

1. An adaptive equalizer, comprising:
an adaptive filter being configured to perform an adaptive equalization processing for an input signal to make an amplitude of an equalized output signal constant, the input signal being modulated by a modulation method that produces a modulation signal with constant amplitude characteristics; and
a control unit to control stop and execution of the adaptive equalization processing of the adaptive filter in accordance with characteristics of at least one of the input signal and the output signal,
wherein the control unit determines an environment involving non-convergence, oscillation, or divergence of filter coefficients of the adaptive filter in accordance with characteristics of at least one of the input signal and the output signal, and stops the adaptive equalization processing of the adaptive filter under the determined environment.

2. The adaptive equalizer according to claim 1, wherein the control unit converges filter coefficients of the adaptive filter to predetermined values so as to stop the adaptive equalization processing of the adaptive filter, and cancels convergence of the filter coefficients to the predetermined values so as to execute the adaptive equalization processing of the adaptive filter.

3. The adaptive equalizer according to claim 2, wherein the control unit converges one of the filter coefficients to 1, and the remaining filter coefficients to 0 so as to stop the adaptive equalization processing of the adaptive filter.

4. The adaptive equalizer according to claim 3, wherein:
the adaptive filter includes a filter coefficient calculating unit to calculate the filter coefficients in accordance with control of the control unit,
the filter coefficient calculating unit multiplies a current filter coefficient by a multiplier factor K that is larger than 0 and smaller than 1 to calculate a filter coefficient used for subsequent sampling if the filter coefficient is made to converge to 0, and
the filter coefficient calculating unit subtracts 1 from a current filter coefficient, multiples a subtracting result by a multiplier factor K' that is larger than 0 and smaller than 1, and then adds 1 to a multiplication result to calculate the filter coefficient used for subsequent sampling if the filter coefficient is made to converge to 1.

5. The adaptive equalizer according to claim 4, wherein the multiplier factors K and K' are sent from the control unit to the filter coefficient calculating unit.

6. The adaptive equalizer according to claim 4, wherein the multiplier factors K and K' are calculated by calculating $1-L\times 2^{-m}$ where m is a positive integer and L is a variable of 0 or 1, and
the variable L is sent from the control unit to the filter coefficient calculating unit as a binary logic signal.

7. The adaptive equalizer according to claim 3, wherein the adaptive filter includes a filter coefficient calculating unit to calculate the filter coefficients in accordance with control of the control unit,
the filter coefficient calculating unit multiplies a current filter coefficient by a multiplier factor K that is larger than 0 and smaller than 1 to calculate a filter coefficient used for subsequent sampling if the filter coefficient is made to converge to 0, and
the filter coefficient calculating unit calculates the filter coefficient by adding 1 to a variable C, and multiplies a current filter coefficient by a multiplier factor K' that is larger than 0 and smaller than 1 to add 1 to a multiplication result to calculate the variable C used for subsequent sampling if the filter coefficient is made to converge to 1.

8. The adaptive equalizer according to claim 7, wherein the multiplier factors K and K' are sent from the control unit to the filter coefficient calculating unit.

9. The adaptive equalizer according to claim 7, wherein the multiplier factors K and K' are calculated by calculating $1-L\times 2^{-m}$ where m is a positive integer and L is a variable of 0 or 1, and
the variable L is sent from the control unit to the filter coefficient calculating unit as a binary logic signal.

10. The adaptive equalizer according to claim 1, wherein the control unit controls execution and stop of the adaptive equalization processing of the adaptive filter based on a signal intensity of a multipath signal included in the input signal.

11. The adaptive equalizer according to claim 1, wherein the control unit controls execution and stop of the adaptive equalization processing of the adaptive filter based on a signal intensity of the input signal.

12. The adaptive equalizer according to claim 1, wherein the control unit controls execution and stop of the adaptive equalization processing of the adaptive filter based on variations of signal intensity of the output signal.

13. The adaptive equalizer according to claim 1, wherein the control unit causes the adaptive filter to execute the adaptive equalization processing irrespective of signal intensity of a multipath signal included in the input signal if signal intensity of the input signal exceeds a predetermined threshold value.

14. The adaptive equalizer according to claim 1, wherein the input signal comprises a frequency modulated signal.

15. The adaptive equalizer according to claim 1, wherein the input signal comprises a frequency modulated signal, and the control unit controls execution and stop of the adaptive equalization processing of the adaptive filter based on signal intensity of an adjacent-channel signal included in the input signal.

16. The adaptive equalizer according to claim 15, wherein the control unit causes the adaptive filter to execute the adaptive equalization processing irrespective of signal intensity of a multipath signal included in the input signal if signal intensity of an adjacent-channel signal included in the input signal exceeds a predetermined threshold value.

17. A receiver, comprising:
an adaptive equalizer according to claim 1 to perform adaptive equalization processing on a received signal that is received by the receiver; and
a demodulation unit to demodulate an output signal from the adaptive equalizer.

18. The receiver according to claim 17, wherein the received signal is a frequency modulated signal, and
the control unit controls execution and stop of the adaptive equalization processing of the adaptive filter based on DC offset components of a signal subjected to FM detection with the demodulation unit.

19. An adaptive equalizer, comprising:
an adaptive filter processing a modulated input signal to an equalized output signal having a constant amplitude;
a detection unit determining characteristics of at least one of the input signal and the output signal from a signal path of the adaptive filter; and
a control unit stopping and starting the adaptive filter to process the modulated input signal to the equalized output signal having a constant amplitude according to the determined characteristics of at least one of the input signal and the output signal from the detection unit in the signal path of the adaptive filter,
wherein the control unit determines an environment involving non-convergence, oscillation, or divergence of filter coefficients of the adaptive filter in accordance with characteristics of at least one of the input signal and the output signal, and stops the adaptive equalization processing of the adaptive filter under the determined environment.

* * * * *